(12) United States Patent
Arbuckle et al.

(10) Patent No.: US 6,684,556 B1
(45) Date of Patent: Feb. 3, 2004

(54) REMOTELY CONTROLLED VIBRATING FISHING BAIT

(76) Inventors: David B. Arbuckle, 4990 N. 550 W., Fairland, IN (US) 46126; John M. Bradshaw, 4340 N. Park Ave., Indianapolis, IN (US) 46205

( * ) Notice: Subject to any disclaimer, the term of this patent is extended or adjusted under 35 U.S.C. 154(b) by 274 days.

(21) Appl. No.: 09/590,092

(22) Filed: Jun. 7, 2000

(51) Int. Cl.$^7$ .............................................. A01K 85/01
(52) U.S. Cl. ........................ 43/17.1; 43/26.2; 43/42.31
(58) Field of Search ................................ 43/17.1, 26.1, 43/26.2, 42.31; 340/407.1

(56) References Cited

U.S. PATENT DOCUMENTS

| | | | | |
|---|---|---|---|---|
| 726,020 A | * | 4/1903 | Bryan | 43/26.2 |
| 1,401,096 A | * | 12/1921 | Neudeck | 43/26.2 |
| 2,559,475 A | * | 7/1951 | Sparkman | 43/26.2 |
| 2,624,145 A | | 1/1953 | Wehn | 43/17.1 |
| 2,655,757 A | * | 10/1953 | Boyce | 43/26.2 |
| 3,045,381 A | | 7/1962 | Martin | 43/26.2 |
| 3,085,361 A | * | 4/1963 | Rhodes | 43/26.2 |
| 3,120,073 A | * | 2/1964 | Brunton | 43/17.1 |
| 3,165,854 A | | 1/1965 | Teetor | 43/17.1 |
| 3,235,999 A | * | 2/1966 | Wieszeck | 43/17.1 |
| 3,416,254 A | | 12/1968 | Bornzin | 43/17.1 |
| 3,618,070 A | * | 11/1971 | Kagan | 340/407.1 |
| 3,841,012 A | * | 10/1974 | Maled | 43/26.2 |
| 4,223,467 A | | 9/1980 | Hodges, Jr. et al. | 43/42.31 |
| 4,380,132 A | | 4/1983 | Atkinson | 43/26.2 |
| 4,583,313 A | | 4/1986 | Dugan, Jr. | 43/17.1 |
| 4,731,603 A | * | 3/1988 | McRae et al. | 340/407.1 |
| 4,794,392 A | * | 12/1988 | Selinko | 340/407.1 |
| 4,805,339 A | | 2/1989 | Fuentes et al. | 43/42.31 |
| 5,086,581 A | * | 2/1992 | Barra et al. | 43/26.1 |
| 5,172,092 A | * | 12/1992 | Nguyen et al. | 340/407.1 |
| 5,203,103 A | * | 4/1993 | Hawley | 43/17.1 |
| 5,331,760 A | | 7/1994 | DuMont | 43/17.1 |
| 5,353,017 A | * | 10/1994 | Suzuki et al. | 340/407.1 |
| 5,436,622 A | * | 7/1995 | Gutman et al. | 340/407.1 |
| 5,511,335 A | * | 4/1996 | Langer | 43/17.1 |
| 5,524,326 A | * | 6/1996 | Markowitz | 446/272 |
| 5,765,508 A | * | 6/1998 | Markowitz | 446/456 |
| 5,801,466 A | * | 9/1998 | Odagiri et al. | 340/407.1 |
| 5,894,263 A | | 4/1999 | Shimakawa et al. | 340/388.1 |
| 5,896,096 A | | 4/1999 | Kim | 340/7.24 |
| 5,898,364 A | | 4/1999 | Gotou | 340/407.1 |
| 5,936,516 A | * | 8/1999 | Narea et al. | 340/407.1 |
| 6,028,531 A | * | 2/2000 | Wanderlich | 340/407.1 |
| 6,033,285 A | * | 3/2000 | Fine et al. | 446/3 |
| 6,039,628 A | * | 3/2000 | Kusmiss et al. | 446/290 |
| 6,122,852 A | * | 9/2000 | Mechling, IV | 43/26.1 |
| 6,189,256 B1 | * | 2/2001 | Boys | 43/26.2 |
| 6,305,120 B1 | * | 10/2001 | Boys | 43/17.2 |
| 6,317,032 B1 | * | 11/2001 | Oishi | 340/407.1 |
| 6,389,732 B1 | * | 5/2002 | Daniel | 43/26.1 |
| 6,581,319 B2 | * | 6/2003 | West | 43/26.2 |

FOREIGN PATENT DOCUMENTS

| | | | | |
|---|---|---|---|---|
| DE | 19512031 B1 | * | 10/1996 | |
| JP | 10-330890 B1 | * | 2/1998 | |
| SE | 214284 B1 | * | 7/1967 | 43/26.2 |

* cited by examiner

*Primary Examiner*—Darren W. Ark
(74) *Attorney, Agent, or Firm*—Woodard, Emhardt, Moriarty, McNett & Henry LLP

(57) ABSTRACT

A remotely controlled vibrating fishing lure. The lure has a body, a transmitter, a receiver, and a battery operated vibration member controlled by the receiver. The vibrating member may be contained in a fluid tight chamber in the lure body or placed in a housing adjacent the lure body. The transmitter is operable to selectively transmit an electromagnetic radio signal to the receiver to selectively vibrate the fishing lure. A conventional transmitter and receiver may be used, and the vibration member can be of the type traditionally used in telecommunications paging systems. The lure is adapted to float or the receiver antenna is provided with a bobber or other means to retain a portion of the antenna above the water.

33 Claims, 7 Drawing Sheets

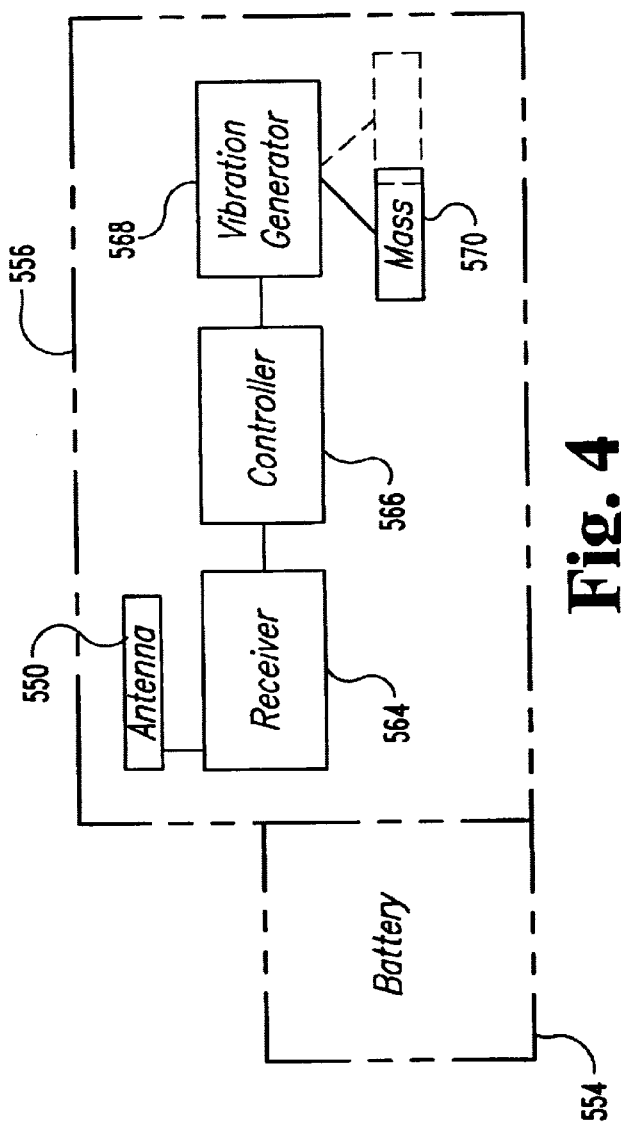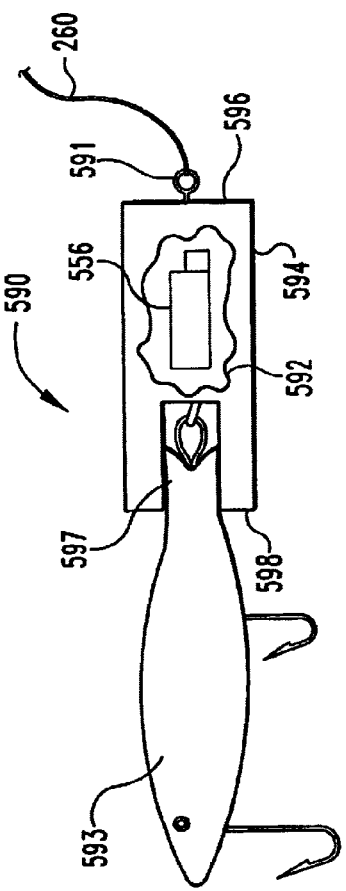
Fig. 4
Fig. 4a

REMOTELY CONTROLLED VIBRATING FISHING BAIT

This invention relates to the field of fishing, and more particularly, to controllable fishing lures and methods of use.

In the accompanying drawings:

FIG. 4 is a schematic showing detail of a vibrating member.

FIG. 4a is a side view of a vibrating lure holder according to another embodiment of the present invention.

Figure 1:
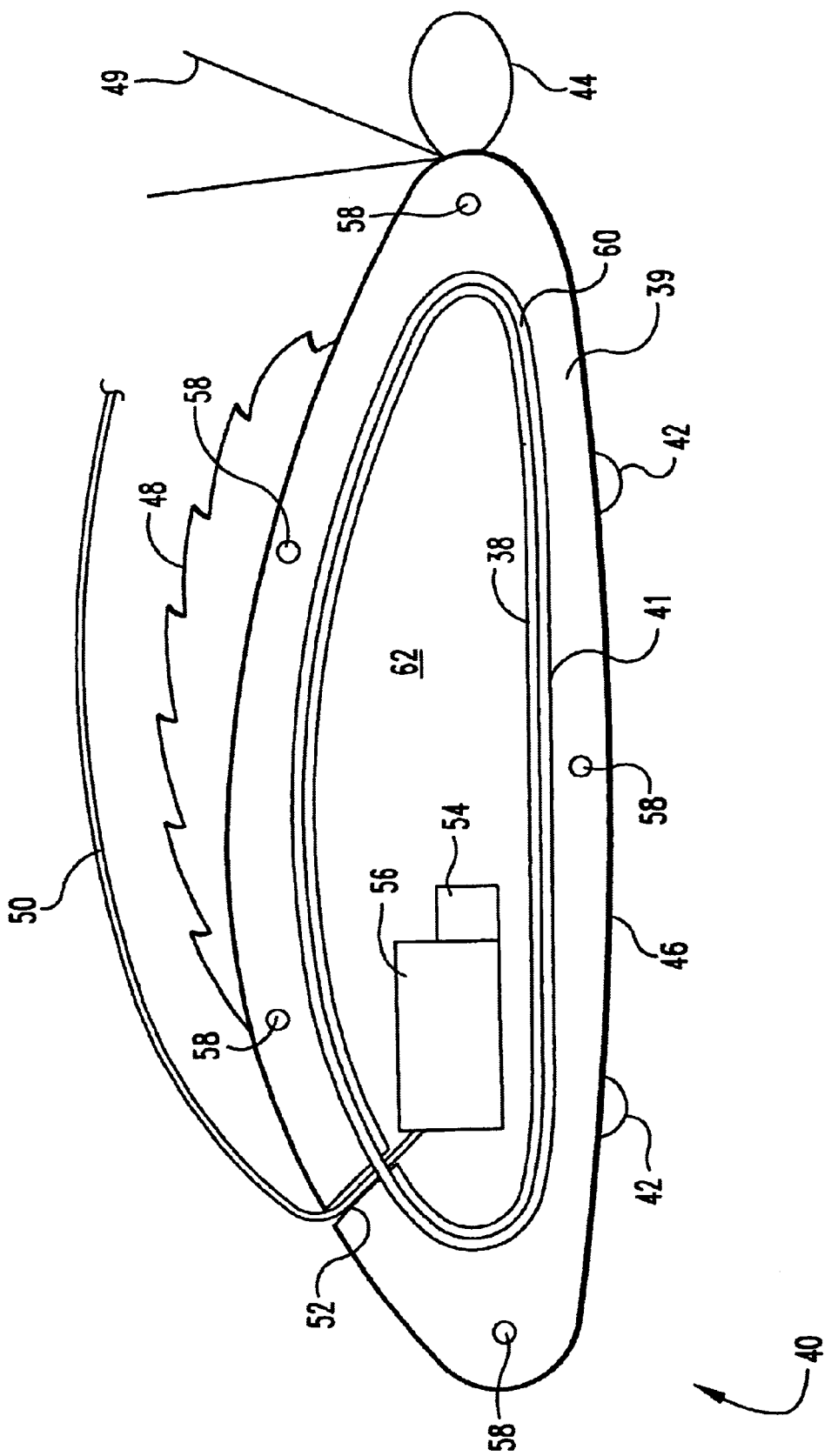
FIG. 1 is a cross-sectional view of a fishing lure according to an embodiment of the present invention.

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated being contemplated as would normally occur to one skilled in the art to which the invention relates.

FIG. 1 shows a cross-sectional view of fishing lure 40 according to an embodiment of the present invention. Lure 40 has supports 42 to provide mounts to attach fish hooks and has line tie 44 to provide a mount to tie fishing line. Lure 40 is preferably decorated to attract fish, for example by being disguised to resemble a fish's food, such as a small fish, a frog, a crayfish, a squid, a snake, a toad, a worm, or an insect. Consequently, lure 40 may also include decorative structures on its body, such as fins 48 and/or tail strings 49, as well as other decorative structures such as legs, wings, eyes, webbed feet, whiskers, or feathers. In this particular embodiment, lure 40 is shown largely hollow with an outer surface 46 and an inner surface 38. Inner surface 38 defines chamber 62. And within chamber 62, resides the electronic components that are discussed later in this patent.

Chamber 62 is preferably sealably isolated from any water in which lure 40 may be placed in order to protect the electronic components that are inside lure 40. For example, lure 40 may preferably have two portions, a first half 39 (shown) and a complementary second half (not shown) that sealingly engages the first half 39. Such a seal may be provided by a sealing ring 60 that partially resides within a channel 41 in the first half 39. When the first half 39 mates with the second half, the portion of sealing ring 60 rising above the channel in the first half 39 presses into a similar channel in the second half. Thusly placed, sealing ring 60 prevents water from entering chamber 62 by simultaneously pressing against the bottom of the channel in each half. Sealing ring 60 is preferably made of rubber or some other flexible polymer such as silicone, but also could simply be an adhesive that glues the two halves together. In this regard, it is preferable that female retention holes 58 are located in one half of the lure and complementary male protrusions are located in the other half. These male-female connections can be used to provide a snap-tight fit or friction-fit between the two pieces and/or insure that the two halves of lure 40 are properly aligned. Alternatively, it is also contemplated that chamber 62 could be in fluid communication with any water in which lure 40 may be exposed. But in general, this would require that any of the electrical components, discussed below, are waterproofed by other means, for example, by encasing them in a watertight pouch, wax, silicone, or other water-impermeable housing or sealant.

The vibrating member 56 disposed within chamber 62 includes battery 54 and antenna 50. Antenna 50 is electrically connected to receiver 564 (FIG. 4) and exits chamber 62 through antenna channel 52. Water-tight security may be maintained within chamber 62 by sealing channel 52 with adhesive or some other polymer once antenna 50 is properly located. Vibrating member 56 is preferably retained within chamber 62 by friction engagement with the inner surface 38 of chamber 62, or lure 40 could include additional structures such as retaining posts, recesses, grooves, padding, adhesive, or a combination thereof to hold vibrating member 56 in place. Alternatively, however, it is also contemplated that vibrating member 56 may be loosely disposed or freely moveable within chamber 62. Depending on the desired effect, the user may prefer that the unit be loosely placed within chamber 62 to further mimic the actions of live or wounded bait when the unit is activated.

Figure 2:
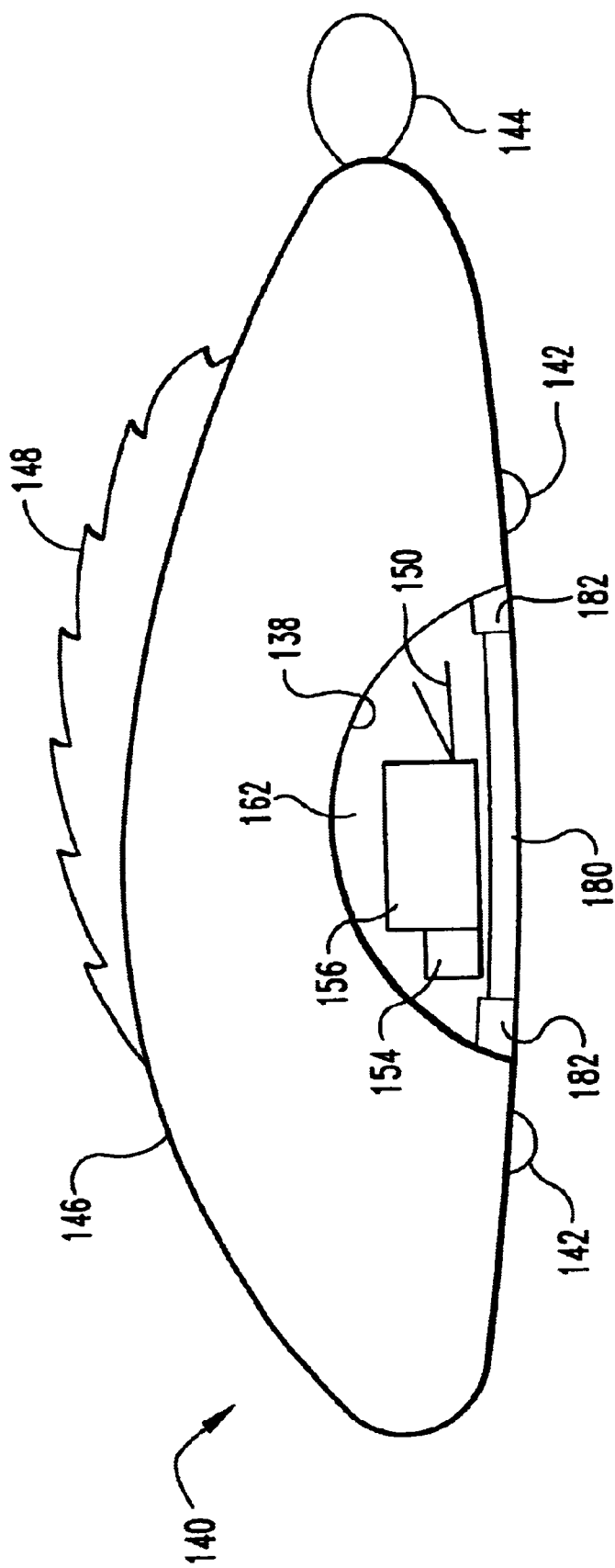
FIG. 2 is a cross-sectional view of a fishing lure according to another embodiment of the present invention.

FIG. 2 depicts another embodiment of a fishing lure according to the invention. In this embodiment, lure 140 is largely similar to lure 40 (FIG. 1). Lure 140 also preferably has a body 146, an interior chamber 162, an interior surface 138, hook supports 142, line tie 144, and any of the previously described decorative structures, such as fin 148. In this particular embodiment, however, lure 140 is not separated into halves. Instead, access to interior chamber 162 is provided by plug 180. Plug 180 makes a fluid tight seal with body 146 to seal chamber 162 by threadingly engaging body 146, by being friction fitted against stops 182, or by simply gluing plug 180 into place. As a result, any access to the oscillating or vibrating member 156, battery 154 or antennae 150 is provided by removing plug 180.

Alternatively, a fishing lure according to the present invention could have more than one vibrating member attached or contained within the lure. Additional vibrating members could be mounted on the exterior surface of lure body, on a portion of the fishing line, or within other chambers within the lure. Moreover, multiple vibrating members could be programmed so to provide additional effects once activated. For example, vibrating members could be activated and stopped in sequence, beginning at the head and finishing at the tail, so as to mimic crawling or swimming.

Figure 3:
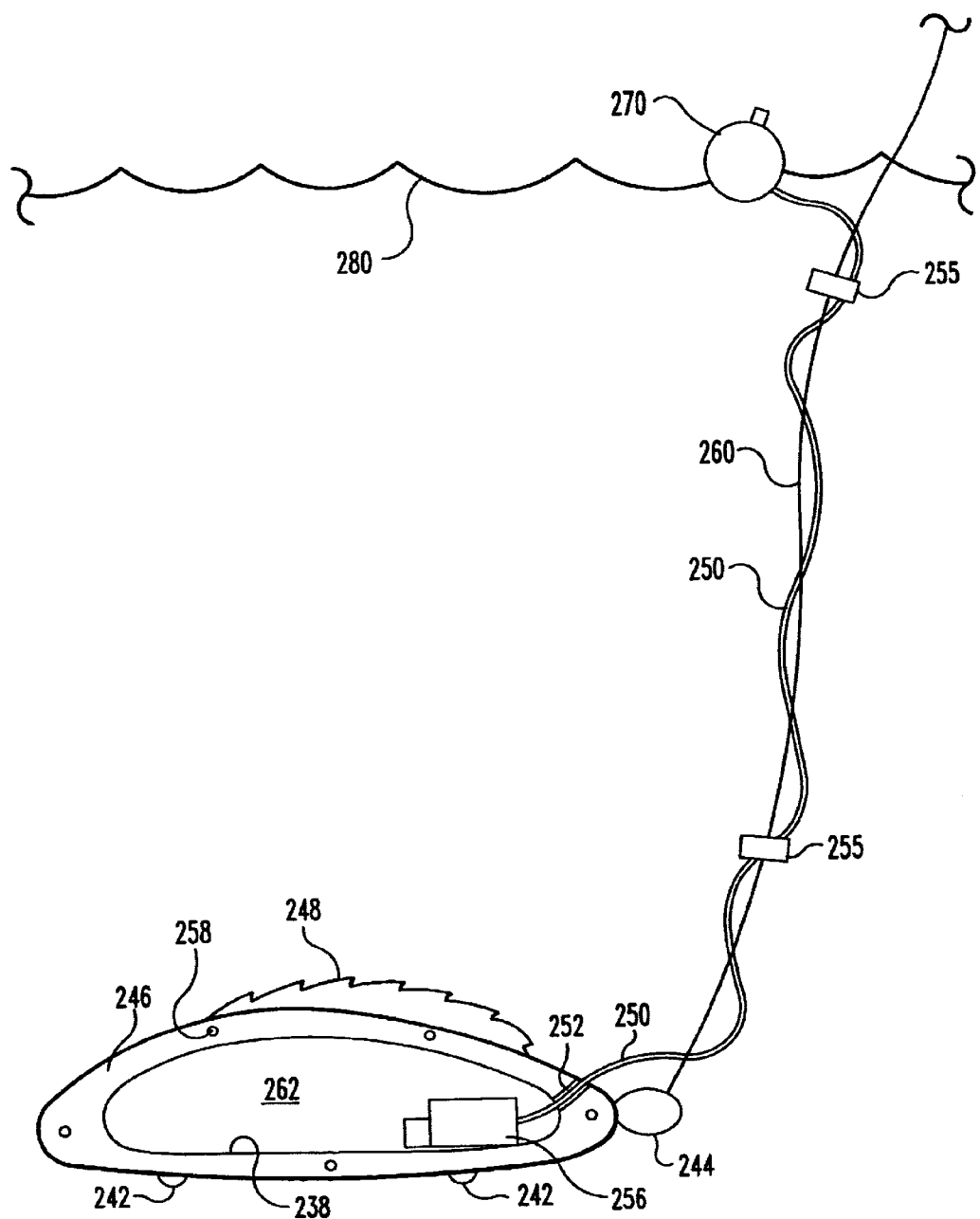
FIG. 3 is a cross-sectional view of a fishing lure according to another embodiment of the present invention.

FIG. 3 shows yet another alternative arrangement for a lure according to the present invention. Similar to the previously discussed lures, this lure also preferably includes a vibrator or oscillator 256, a body 246, an interior chamber 262, an interior surface 238, hook supports 242, line tie 244, male-female contacts 258, and any of the previously described decorative structures, such as fin 248. Antenna 250, however, extends from chamber 262, through antenna channel 252 and is spiral wrapped around the fishing line 260. And in addition to or in place of spiral wrap, antenna 250 may be secured to fishing line 260 by retaining clips 255. Optionally, one may also place a buoyant member, such as bobber 270, on the antenna or the fishing line to keep the antenna above the surface of the water 280. Or one may simply allow the antenna to float free of the fishing line allowing only the buoyant member to keep it above the surface.

Turning more particularly to the details of the electronics, FIG. 4 shows a schematic illustrating a vibration member according to the present invention. The vibrating member includes a receiver 564 coupled to a controller 566 for selective activation of vibrating motor 568. Controller can be any controller known in the art and, for example, may be a switch or series of switches for selectively producing binary or multiple output control signals for selectively actuating vibration generator 568.

As is known in the art, a vibrating motor oscillates or rotates member 570 in sequential or rotational motion to produce a vibrating or oscillating effect on vibrating member 556. In one embodiment, member 570 is made to rotate about an axis offset from the center of mass to produce a wobbling effect. Vibration member 556 would in turn impart relative motion to an adjacent object, such as a conventional fishing lure, or any other object to which it is in mechanical communication. When coupled to a fishing lure according to an embodiment of the present invention, the vibrating or oscillating effect imparted to the lure should preferably, though not essentially, be visually perceptible to humans.

Battery 554 provides electrical power for the components of vibrating member 556 and preferably battery 554 is adapted for long term use and/or is interchangeable or replaceable. Moreover, when included on or near a fishing lure according to the present invention, the size and weight of vibrating member should be adapted to not interfere with traditional fishing techniques. For example, if the lure is supposed to float on or near the surface of the water, the vibrating member should be sufficiently light weight to allow the lure to be placed at the proper depth by the fisherman.

In operation receiver 564 receives a signal through antenna 550. Receiver 564 then provides an input to controller switch 566 to selectively engage vibrating motor 568. Motor 568 in turn vibrates mass 570. As is well known in the art, input to the controller may include a security code to uniquely identify a particular transmitted signal. Controller 566 can identify and respond to the input to engage motor 568 only upon receipt of a predetermined signal or set or combination of signals. In this way, unwanted interference from external noise or other fishermen using similar lures can effectively be avoided. Alternatively, a randomized pattern of vibration may be advantageous in certain applications, and controller could be programmed and/or configured to respond to any type of signal.

As is known in the art receiver 564 can respond to any electromagnetic signal and preferably receives an RF signal along a wireless RF transmission path. In one embodiment the receiver receives a signal on a carrier frequency on the range of 250–1000 MHz, preferably 300–500 Mhz, but it is understood that receiver may be configured to receive at any available frequency used for electronic communication. When the receiver is used in an underwater application, the transmitted power and frequency can be adapted as in know in the art to provide optimal reception.

In one embodiment, the receiver is an AM receiver module operating at 433 MHz such as the AM-HHR3 and AM-HHR6 AM receiver module available from ABACOM Technologies, 32 Blair Athol Crescent, Etobiocoke, Ontario, Canada. In another embodiment the RF300 Series receiver from Visitect Inc., P.O. 14156, Fremont, Calif. 94539 could also be used.

In addition, the antenna may be sized and configured to optimize signal reception or multiple antennas may be used. For example, the antenna may be adjustable or could be fixed at, for example, ¼ of the signal wavelength.

While switch 566 could be a simple on/off switch it should be understood that receiver 564 and controller 566 can be adapted to provide multiple levels of control for vibrating motor 568. For example receiver 564 can respond to various signals to provide multiple levels of vibrations or multiple vibration patterns. In this embodiment, switch 566 can provide multiple levels of control. In this way the vibrating member 556 can be controlled to move according to predetermined desired characteristics. In particular different levels of vibration or movement may be desirable to imitate certain types of bait or to attract certain types of fish.

Vibrating members with multiple levels are known in the art. U.S. Pat. No. 5,896,096 to Kim, which is hereby incorporated in its entirety by reference, describes one such sequential vibrating member.

It is understood that vibration member 556 can be included in any of the lures of the present invention, such as those depicted in FIGS. 1–3. Moreover, conventional fishing lures can be adapted to receive a vibration member according to the present invention as would occur to those of skill in the art. In particular, vibration members can be fastened or strapped adjacent a lure body, such as on the fishing line within about 5–10 inches of the lure, or the lure body can be hollowed to receive the vibration member internally. Moreover, although placement of the vibration member near the lure body is preferable for some applications, a vibration member can be provided anywhere on the fishing line.

In another embodiment, vibration member 556 can be provided as a separate piece adapted to be coupled to any of various types of conventional fishing lures. FIG. 4a shows lure holder 590 comprising vibration member 556 within a watertight container 592. Holder 590 includes a housing 594 adapted to be tied or secured to a fishing line 260. In one embodiment, fishing line passes through housing 594 from proximal portion 596 to distal portion 598. Distal portion 598 includes recessed chamber 597 for receiving and preferably holding conventional lure 593, such that, as depicted in FIG. 4a, vibration member 556 is adjacent lure 593. Distal portion 598 can include compression members or clips for friction engagement with lure 593. Recessed chamber 597 can include other means for retention such as grooves or members for engaging an exterior surface of lure 593 or a post for penetrating the exterior surface and engaging the interior of lure 593. Along with retaining lure 593, distal end 598 can serve to impart vibration to lure when vibration member 556 is activated.

In another embodiment, fishing line 260 passes through holder 590 and a clamp or knot 591 is provided at proximal end 596 of holder 590, to prevent relative motion between holder and line. In this way relative motion between lure 593 and holder 590 can be diminished or prevented to retain lure within chamber 597. In addition, with retention member 591 removed, holder 590 is free to slide up line and out of engagement with lure 593. Lure 593 may be accessed and/or replaced with a different lure and holder 590 slid down the line into engagement with a new lure. Clamp or knot 591 is then optionally replaced to provide a vibrating fishing lure according to one embodiment of the present invention.

Figure 5:
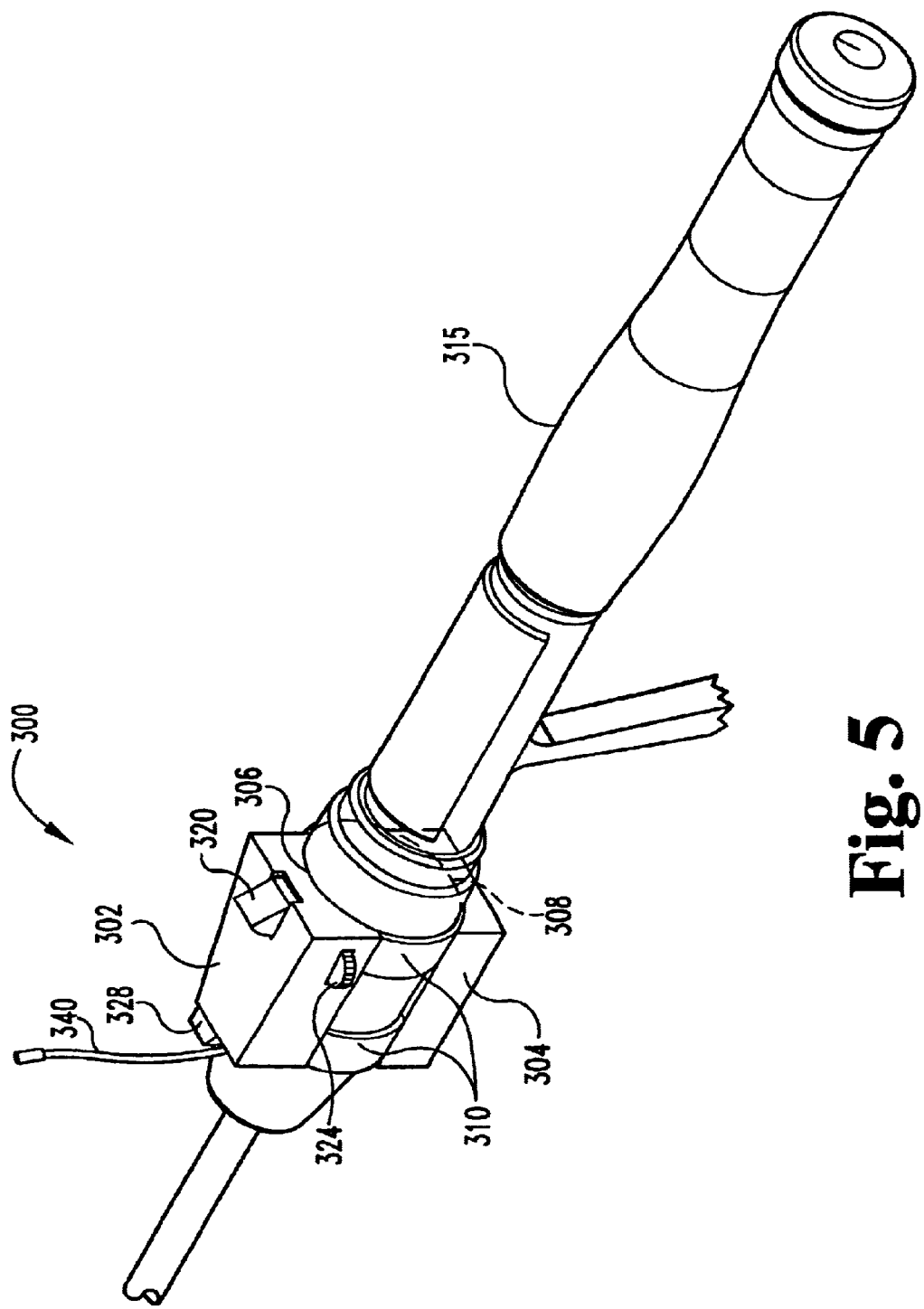
FIG. 5 is a perspective view of a transmitter according to an embodiment of the present invention.

FIG. 5 shows a transmitter according to an embodiment of the present invention. The transmitter 300 includes a top housing 302 and a bottom housing 304 each including a recessed channel 306 and 308 for receiving pole 315. Housings 302 and 304 are provided with coupling members 310 for joining the upper and lower housing members 302 and 304 about a fishing pole 315. Alternatively transmitter 300 may include a clip or strap, such as a velcro strap, for attachment to the fisherman's pole, wrist, belt, or other object to facilitate operation of the transmitter while fishing.

As is well known in the art, transmitter 300 includes a coil (not shown) for emitting a predetermined controlled electromagnetic signal for communication with a receiver such as receiver 564 in FIG. 4. Transmitter 300 is included with button 320 for activating transmitter. Button 320 can be either an on/off switch or may provide variable levels of output based upon, for example, the extent of operator engagement. Optionally transmitter includes dial 324 for adjusting the signal in some well known fashion to produce varying outputs that may, upon reception and processing, select different vibration patterns or intensities. Transmitter 300 may also have a channel selector to modify the output frequency or channel and to communicate the same to the receiver.

As is known in the art transmitter 300 has power source 328 and transmits on any radio frequency typically used for electronic communications. Preferably transmitter 320 is a variable output transmitter and transmits at a given power output.

In one embodiment, the RF300 series such as RF300XT transmitter from Visitect could be used. Alternatively, AM transmitter AM-RT4 and 5-XXX transmitters from ABA-COM Technologies may also be used. As is known in the art, transmitter 300 may be provided with external antenna 340 or antenna 340 may be incorporated within the casing, such as casing 302. Optionally, the fishing line can be adapted to serve as a transmitting antenna or medium, and communication between transmitter and receiver can utilize the fishing line as would occur to one of skill in the art.

Figure 6:
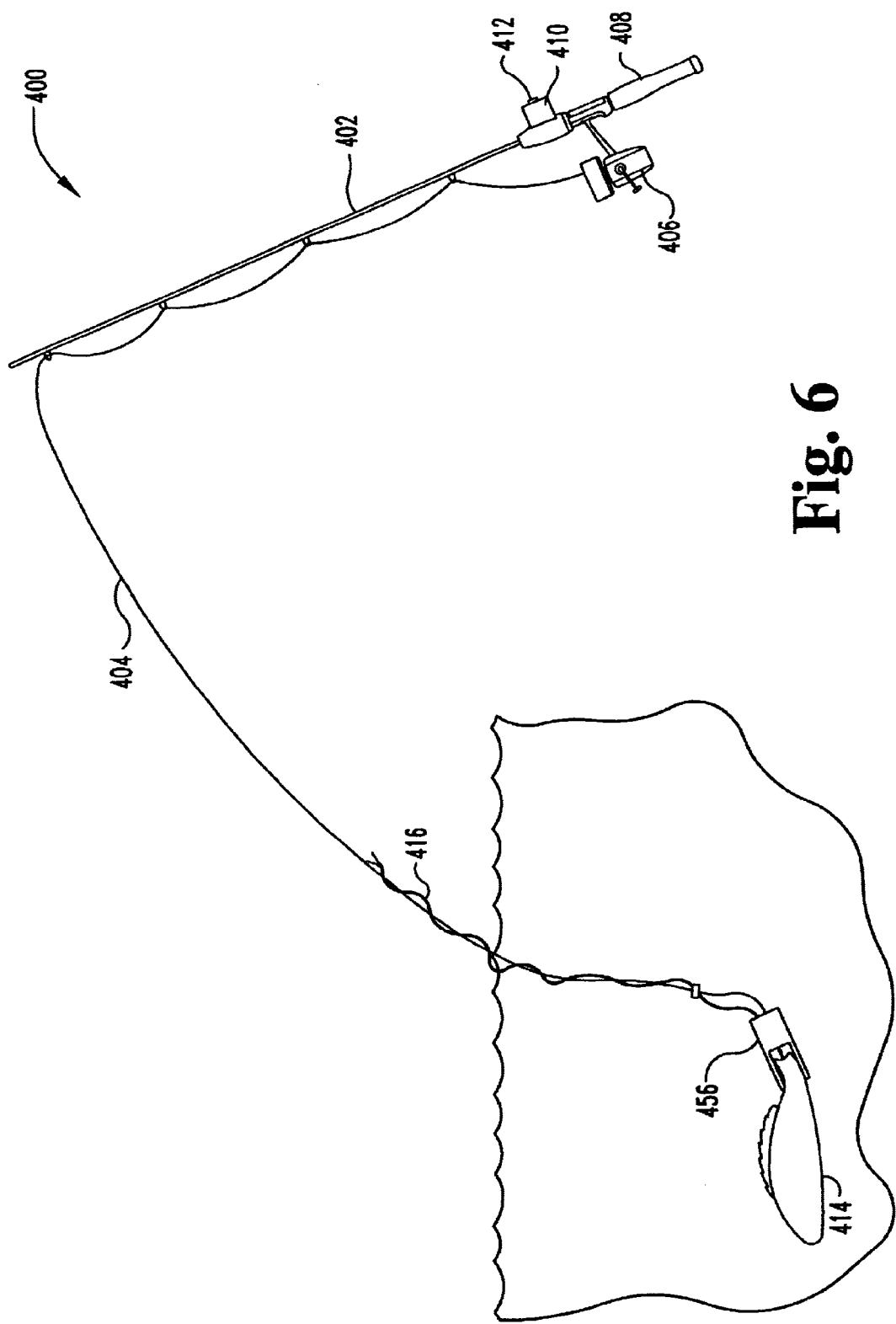
FIG. 6 is a fishing system according to one embodiment of the present invention.

FIG. 6 illustrates a fishing system according to the present invention. Fishing system 400 comprises a fishing rod 402 having fishing line 404 attached to reel 406. Fishing rod includes a handle 408 and a transmitter 410 with an operation means such as button 412 for selective operation of the transmitter. At the end of the line 404 is vibrating lure 414 including antenna 416 disposed about line 404. Antenna 416 is coupled to a receiver (not shown) within or upon lure 414 for receiving electromagnetic or radio signal transmitted by transmitter 410.

Receiver is provided with a controller coupled to a vibrating or oscillating means 456 for selectively producing motion or oscillation to the lure 414. Antenna 416 is wrapped around line 404 or could optionally be provided with a buoyant member (not shown) for keeping antenna 416 near or above a surface of the water. Transmitter 410 and the receiver within lure 414 can be any means known in the art for wirelessly transmitting operational instructions over a distance. To prevent interference with competing communications devices or other similar lures transmitting means 410, the receiving means can be programmed for secure operation. Moreover the transmitter and receiver can be adapted to send more than just an on/off signal such as to provide multiple levels of control to lure 414.

Figure 7:
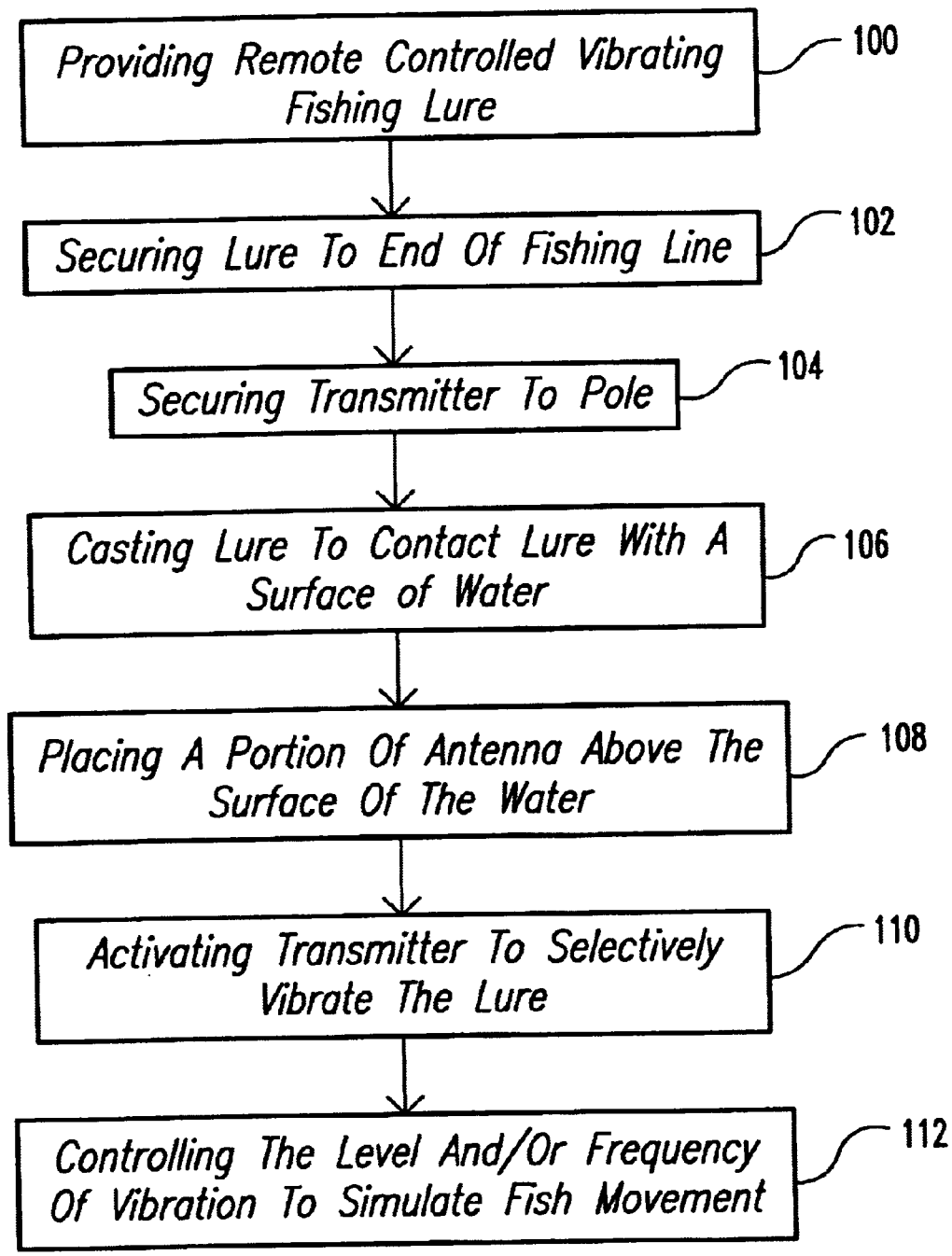
FIG. 7 is a flowchart of a fishing method according to an embodiment of the present invention.

The flow chart of FIG. 7 describes a fishing method according to another embodiment of the present invention. At operation 100 a remote controlled vibrating fishing lure is provided and secured to the end of the fishing line 102. Operation 102 may also include providing a quick tie or quick fit mechanism to the line to allow rapid interchange between different lures on a single line. According to operation 104 a transmitter adapted to communicate with a receiver in the remote controlled fishing lure can be secured to the fishing pole. Optionally the transmitter could be hand held or clipped to a belt or placed in a pocket or otherwise placed in operational reach with the fisherman. The fisherman then casts the lure to contact the lure with the surface of the water. The lure, such as any of the lures described above, is preferably adapted to float or otherwise remain near the surface of the water. Alternatively the lure could be adapted to be below the surface of the water and in such adaptation would preferably have an antenna extending towards or above the surface of the water to facilitate signal reception.

Operation 108 describes placing the portion of the antenna above the surface of the water. This may be accomplished by wrapping an exterior antenna of the lure around the fishing line and providing tension to the line. Alternatively the lure itself may be made relatively buoyant and remains near the surface of the water. Alternatively the antenna could be provided with a buoyant member or bobber for providing a retaining force retaining a portion of the antenna near the surface of the water.

In operation 110 the transmitter is activated to selectively vibrate the lure. The transmitter can be made to operate in short bursts or a continuous burst or otherwise controlled to produce desired vibration in the lure. To conserve battery life, the electrical components of the lure are preferably operated in cyclic, non-continuous fashion. The operation of sequentially vibrating the lure also may preferably simulate the motion of a floundering or wounded fish and serve to attract predatory fish. In conjunction with step 110 the fisherman may reel in or otherwise apply tension to the line utilizing traditional fishing techniques. By combining traditional fishing techniques and the selective remote vibration of a lure it is believed that improved attraction of fish can be accomplished. As an additional feature the level and/or frequency of the vibration can be controlled by selective operation of the transmitter and receiver to more accurately simulate the movement of a wounded fish. Moreover, in addition to producing mechanical vibration, a lure according to one embodiment of the present invention may produce sound waves to further attract the desired fish.

It is understood that remote activated vibrating members or vibrating means are known in the art. For example traditional vibrators and oscillators used in telecommunication pagers could be adapted to be used in the fishing lure of the present invention. Representative of the remote activated vibrating members are U.S. Pat. No. 5,896,096 to Kim, U.S. Pat. No. 5,894,263 to Shimakawa et al., and U.S. Pat. No. 5,898,364 to Gotou which are each hereby incorporated by reference.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

We claim:

1. A vibrating fishing lure comprising:
    a lure body adapted to float in water and including at least first and second mounts extending from said lure body at spaced locations, said first mount coupled to a fish hook and said second mount adapted to be coupled to a fishing line, wherein during use the fishing line is coupled to said second mount; and
    a selectively engagable vibrating member operably associated with said lure body to selectively vibrate said lure body in response to a wireless electromagnetic signal to attract a fish strike.

2. The vibrating fishing lure of claim 1 wherein the vibrating member comprises a battery, a drive means in electrical cooperation with said battery, a switch for selectively engaging said drive means, and a receiver coupled to said switch for selectively engaging said drive means upon receipt of the wireless electromagnetic signal.

3. The vibrating fishing lure of claim 1 wherein the first and second mounts are eyelets.

4. A vibrating fishing lure comprising:
a lure body including at least first and second mounts extending from said lure body at spaced locations, wherein a fish hook is coupled to said first mount in sufficient proximity to said lure body to catch a fish that strikes said lure body and said second mount is adapted for securely coupling said lure body to a fishing line, wherein during use the fishing line is coupled to said second mount; and
a selectively operable vibration device operably associated with said lure body to vibrate said lure body to attract a fish strike, the vibration device including a battery, a moveable mass, a motor electrically coupled to said battery and operable to move said mass, and a receiver responsive to a wireless electromagnetic signal for activating said motor.

5. The vibrating fishing lure of claim 4 wherein the vibration device is inside said lure body.

6. The vibrating fishing lure of claim 4 wherein the vibration device is outside said lure body.

7. The vibrating fishing lure of claim 4 in combination with a transmitter for selectively producing the wireless electromagnetic signal for activating said motor.

8. A fishing system comprising:
a fishing lure comprising a lure body having first and second mounts extending from the lure body at spaced locations and coupled to a fish hook and a fishing line respectively arid a remote activated vibration device for vibrating said lure body to entice fish to strike said lure body, wherein said vibration device comprises a battery, a moveable mass, a motor electrically coupled to said battery and operable to move said mass, and a receiver responsive to a wireless electromagnetic signal for activating said motor.

9. The fishing system of claim 8, including a transmitter selectively operable to transmit a wireless electromagnetic signal for selective operation of said motor.

10. The fishing system of claim 9, wherein said transmitter includes a housing adapted to be secured to fishing equipment.

11. The fishing system of claim 10, wherein said housing includes means for attachment to a fishing pole.

12. The fishing system of claim 8, wherein at least a portion of said vibration device is contained within said lure body.

13. The fishing system of claim 12, wherein at least a portion of said vibration device is contained within a watertight chamber.

14. The fishing system of claim 8, including flexible protrusions on said lure body.

15. The fishing system of claim 8, including an antenna coupled to said receiver.

16. The fishing system of claim 8 wherein said lure body floats in water and activation of the motor imparts motion to said lure body to entice fish to strike said lure body while said lure body is in contact with the surface of the water.

17. A vibrating fishing lure coupled to a fishing line, comprising: a lure body having first and second mounts extending from said lure body at spaced locations and coupled to a fish hook and the fishing line respectively, a moveable member adjacent said body having a first position and a second position, a motor in electrical cooperation with a battery and operatively coupled to said moveable member for moving said moveable member between said first position and said second position, so as to impart motion to said lure body, a receiver responsive to a wireless electromagnetic signal for producing an output, and a controller responsive to said receiver output for selectively engaging said motor to impart motion to said lure body for attracting fish to strike said lure body.

18. The fishing lure of claim 17, wherein said motor is an oscillator.

19. The fishing lure of claim 17, wherein said moveable member is coupled to a housing and said moveable member rotates about an axis offset from the center of mass of said moveable member to vibrate said housing.

20. The fishing lure of claim 17, further comprising an antenna electrically coupled to said receiver.

21. The fishing lure of claim 20, wherein said antenna floats on top of water.

22. The fishing lure of claim 17, including a housing that contains said motor, said moveable member, said receiver, and said controller.

23. The fishing lure of claim 22, wherein said housing is fluid tight and is included within said body.

24. The fishing lure of claim 22 wherein said housing includes means for engaging said body.

25. The fishing lure of claim 24, including means for retaining said housing in contact with said body.

26. The fishing lure of claim 17 in combination with an electrical transmitter for producing the wireless electromagnetic signal.

27. The fishing lure of claim 19 in combination with an electrical transmitter for producing the wireless electromagnetic signal and a clamp to mount said transmitter on a fishing pole.

28. The fishing lure of claim 17 wherein said lure body floats in water and engagement of the motor imparts motion to said lure body to entice fish to strike said lure body while said lure body is in contact with the surface of the water.

29. The vibrating fishing lure of claim 17 wherein the coupling between the fish hook and said lure body consists essentially of an eyelet.

30. A method of fishing comprising:
providing a fishing lure having a selectively engageable vibrating member comprising a battery, a drive means in electrical cooperation with said battery, a switch for selectively engaging said drive means, and a receiver coupled to said switch for selectively engaging said drive means upon receipt of a wireless electromagnetic signal,
providing a transmitter for selectively sending a wireless electromagnetic signal to said receiver,
mounting said fishing lure on a fishing line at a first mount on said fishing lure wherein a fish hook is coupled to a second mount extending from said fishing lure at a location spaced from said first mount,
contacting said fishing lure with a surface of the water,
activating said transmitter to selectively engage said drive means and vibrate said lure to entice fish to strike said lure.

31. The method of claim 30 wherein said lure vibrates while in contact with the surface of the water.

32. The method of claim 30, including providing a fishing pole and mounting said transmitter on said fishing pole.

33. The method of claim 30 wherein said lure floats in water and engagement of the drive means imparts motion to said lure to entice fish to strike said lure while said lure is in contact with the surface of the water.

* * * * *